United States Patent
Chu et al.

(10) Patent No.: US 12,206,756 B2
(45) Date of Patent: Jan. 21, 2025

(54) ELECTRONIC DEVICE WITHIN BLOCKCHAIN BASED PKI DOMAIN, ELECTRONIC DEVICE WITHIN CERTIFICATION AUTHORITY BASED PKI DOMAIN, AND CRYPTOGRAPHIC COMMUNICATION SYSTEM INCLUDING THESE ELECTRONIC DEVICES

(71) Applicant: SAMSUNG ELECTRONICS CO., LTD., Suwon-si (KR)

(72) Inventors: Younsung Chu, Yongin-si (KR); Junho Huh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 17/082,790

(22) Filed: Oct. 28, 2020

(65) Prior Publication Data

US 2021/0306135 A1    Sep. 30, 2021

(30) Foreign Application Priority Data

Mar. 31, 2020 (KR) .................. 10-2020-0039126

(51) Int. Cl.
  *H04L 9/00* (2022.01)
  *H04L 9/06* (2006.01)
  *H04L 9/32* (2006.01)

(52) U.S. Cl.
  CPC .......... *H04L 9/006* (2013.01); *H04L 9/0637* (2013.01); *H04L 9/0643* (2013.01);
  (Continued)

(58) Field of Classification Search
  CPC ..... H04L 9/006; H04L 9/0637; H04L 9/0643; H04L 9/3247; H04L 9/3268; H04L 9/50;
  (Continued)

(56) References Cited

U.S. PATENT DOCUMENTS 6,853,988 B1    2/2005 Dickinson et al.
6,941,455 B2    9/2005 Aull
(Continued)

FOREIGN PATENT DOCUMENTS

KR    10-2042339 B1    11/2019

OTHER PUBLICATIONS

"W. Wang, BlockCAM: A Blockchain-Based Cross-Domain Authentication Model, 2018, 2018 IEEE Third International Conference on Data Science in Cyberspace (DSC), pp. 896-901" (Year: 2018).*
(Continued)

*Primary Examiner* — Kevin Ayala
(74) *Attorney, Agent, or Firm* — Sughrue Mion, PLLC

(57) ABSTRACT

An electronic device of a first domain, which is a blockchain-based public key infrastructure (PKI) domain, includes: an interface configured to receive, from a first entity belonging to a second domain which is a certification authority (CA)-based PKI domain, a first certificate of the first entity and a second certificate of a second entity, wherein the second entity is an upper node of the first entity and is a node of a blockchain; a memory configured to store the first certificate and the second certificate; and a processor configured to look up a transaction corresponding to the second entity at a distributed ledger of the first domain based on an identifier of the second entity, verify the second certificate based on the transaction, and verify the first certificate based on the second certificate.

17 Claims, 10 Drawing Sheets

(52) U.S. Cl.
CPC .......... *H04L 9/3247* (2013.01); *H04L 9/3268* (2013.01); *H04L 9/50* (2022.05)

(58) Field of Classification Search
CPC ... H04L 9/3239; H04L 9/3263; H04L 9/0825; H04L 9/3242; G06F 21/602; G06F 16/27; G06F 21/64; G06Q 40/04
See application file for complete search history.

(56) References Cited

U.S. PATENT DOCUMENTS

| | | | |
|---|---|---|---|
| 8,639,939 | B2 | 1/2014 | Holtzman et al. |
| 8,656,490 | B1 * | 2/2014 | Sobel .................. H04L 63/0807 709/227 |
| 10,158,480 | B1 * | 12/2018 | Winklevoss .......... H04L 9/3247 |
| 10,382,485 | B2 | 8/2019 | Won et al. |
| 10,411,905 | B2 | 9/2019 | Smith et al. |
| 10,454,918 | B1 | 10/2019 | Uhr et al. |
| 10,547,457 | B1 * | 1/2020 | Duccini .................. H04L 63/06 |
| 2018/0254905 | A1 | 9/2018 | Chun |
| 2018/0278427 | A1 * | 9/2018 | Thakore .................. H04L 9/006 |
| 2019/0036682 | A1 | 1/2019 | Qiu |
| 2019/0036711 | A1 | 1/2019 | Qiu |
| 2019/0036712 | A1 * | 1/2019 | Qiu ....................... H04L 9/3268 |
| 2019/0253265 | A1 * | 8/2019 | Pan .......................... H04L 9/30 |
| 2019/0349347 | A1 | 11/2019 | Curtis et al. |
| 2020/0211011 | A1 * | 7/2020 | Anderson .......... G06Q 20/3674 |
| 2021/0083882 | A1 * | 3/2021 | Venable, Sr. ......... H04L 9/3268 |
| 2021/0158347 | A1 * | 5/2021 | Pan ....................... H04L 9/3263 |

OTHER PUBLICATIONS

Y. Chen, Trust Enhancement Scheme for Cross Domain Authentication of PKI System, 2019, International Conference on Cyber-Enabled Distributed Computing and Knowledge Discovery (CyberC), pp. 103-110 (Year: 2019).*

* cited by examiner

ELECTRONIC DEVICE WITHIN BLOCKCHAIN BASED PKI DOMAIN, ELECTRONIC DEVICE WITHIN CERTIFICATION AUTHORITY BASED PKI DOMAIN, AND CRYPTOGRAPHIC COMMUNICATION SYSTEM INCLUDING THESE ELECTRONIC DEVICES

CROSS-REFERENCE TO THE RELATED APPLICATIONS

This application is based on and claims priority from Korean Patent Application No. 10-2020-0039126 filed on Mar. 31, 2020, in the Korean Intellectual Property Office, the disclosure of which is incorporated herein in its entirety by reference.

BACKGROUND

Embodiments described herein relate to a cryptographic communication system, and more particularly, relate to an electronic device in a blockchain-based public key infrastructure (PKI) domain, an electronic device in a certification authority-based PKI domain, and a cryptographic communication system including these electronic devices.

A public key cryptographic technology is known as using two correlated encryption keys (in detail, a public key and a private key). A private key may be open to only a user possessing the private key, and a public key may be open to anyone. The user may encrypt or decrypt a message by using the public key or the private key.

The public key cryptographic technology is used for a PKI for securing and managing a public key that is used in message encryption and an electronic signature. The PKI is a security system for issuing and using an authorization certificate. A user in the PKI may identify himself/herself through an authorization certificate issued by a certification authority (CA). The PKI is a centralized system in which a transaction is made by the CA.

In the centralized PKI, in the case where the root CA is attacked, authorization certificates of all users in the PKI have to be revoked. As such, nowadays, a blockchain-based PKI capable of assuring an identity of a user by verifying, at nodes in a blockchain network, a certificate without CAs of many layers is on the rise.

SUMMARY

Embodiments of the inventive concept provide an electronic device in a blockchain based PKI domain, which enables cryptographic communication with different domains by using a blockchain based PKI domain, an electronic device in a CA based PKI domain, and a cryptographic communication system including these electronic devices.

According to embodiments, there is provided an electronic device of a first domain, which is a blockchain-based PKI domain, including: an interface configured to receive, from a first entity belonging to a second domain which is a certification authority (CA)-based PKI domain, a first certificate of the first entity and a second certificate of a second entity, wherein the second entity is an upper node of the first entity and is a node of a blockchain; a memory configured to store the first certificate and the second certificate; and a processor configured to look up a transaction corresponding to the second entity at a distributed ledger of the first domain based on an identifier of the second entity, verify the second certificate based on the transaction, and verify the first certificate based on the second certificate.

According to embodiments, there is provided an electronic device of a first domain which is a CA-based PKI domain, including: an interface configured to receive a first certificate from a first entity belonging to a second domain which is a blockchain-based PKI domain, transmit a verification request and the first certificate to a second entity, which is an upper node of the electronic device, registered at a blockchain network of the second domain, and receive a response message, from the second entity, based on the verification request; a memory configured to store a second certificate of the second entity; and a processor configured to verify the response message based on the second certificate.

According to embodiments, there is provided a cryptographic communication system which includes: a first electronic device belonging to a first domain, which is a blockchain-based public key infrastructure (PKI) domain, registered at a distributed ledger of the first domain; a second electronic device belonging to a second domain which is a certification authority (CA)-based PKI domain; and a CA, which is an upper node of the second electronic device, registered at the distributed ledger, wherein, depending on a request of the second electronic device, the CA is configured to certify the first electronic device based on a first certificate of the first electronic device and a first transaction corresponding to the first electronic device registered at the distributed ledger, and wherein the first electronic device is configured to certify the second electronic device based on a second certificate of the CA, a second transaction corresponding to the CA registered at the distributed ledger, and a third certificate of the second electronic device.

BRIEF DESCRIPTION OF THE DRAWINGS

The above and other objects and features will become apparent by describing in detail exemplary embodiments thereof with reference to the accompanying drawings.

DETAILED DESCRIPTION

Below, embodiments of the inventive concept will be described clearly and in detail with reference to accompanying drawings to such an extent that an ordinary one in the art implements embodiments. It is noted that the embodiments described herein are all example embodiments, and thus, the inventive concept be embodied in many different forms and should not be construed as limited to the embodiments set forth herein.

Figure 1:
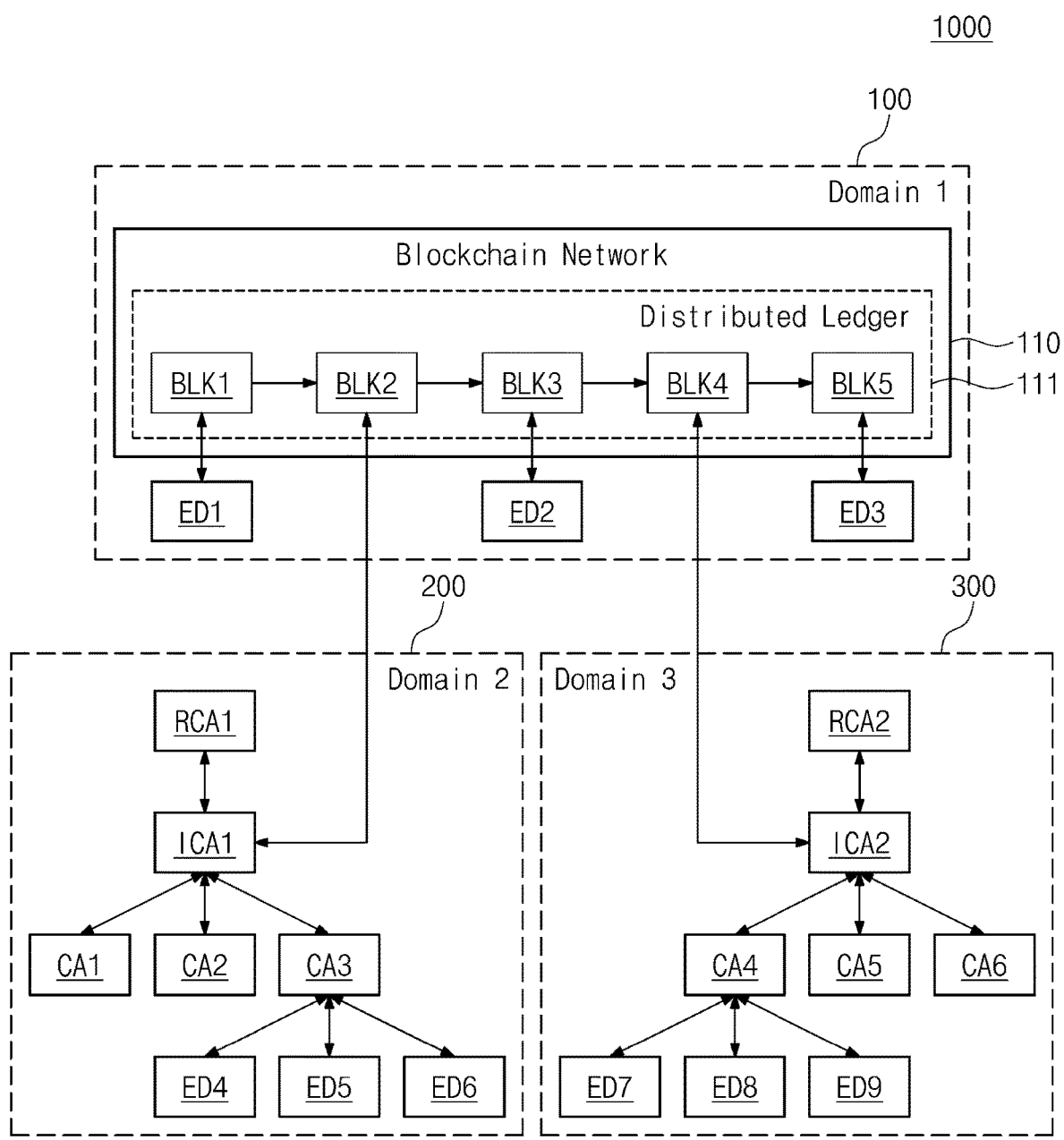
FIG. 1 is a block diagram of a cryptographic communication system according to an embodiment.

FIG. 1 is a block diagram of a cryptographic communication system according to an embodiment. In a cryptographic communication system 1000 of FIG. 1, a public key infrastructure (PKI) based on certification authority (CA) and a blockchain-based PKI may be compatible with each other. Here, it may be understood that a first domain 100 is a blockchain-based PKI domain, and second and third domains 200 and 300 are CA-based PKI domains. The first to third domains 100, 200, and 300 may be different domains.

Referring to the first domain 100, the cryptographic communication system 1000 includes a blockchain network 110 for a blockchain-based PKI. Here, the "blockchain" may mean a distributed ledger technology that allows nodes in the blockchain network 110 to record and manage a ledger that records transaction information, in common. A distributed ledger 111 may be distributed in a P2P network, not a central server of a specific authority, and is implemented at the blockchain network 110. All nodes in the P2P network may provide resources (e.g., a processing capability, a storage space, data, and a network bandwidth) to one another without interference of a central node.

Here, a "node" may mean a component in the blockchain network 110. Nodes correspond to electronic devices (e.g., first to third electronic devices ED1, ED2, and ED3 and first and second intermediate CAs ICA1 and ICA2 to be described later) connected through blockchain network 110. That is, the blockchain network 110 indicates a connection relationship of electronic devices sharing a transaction through the distributed ledger 111. For example, a node or an electronic device may be, but is not limited to, a special-purpose computer, a general-purpose computer, a supercomputer, a mainframe computer, a personal computer (PC), a smartphone, a tablet PC, smart home appliances, etc.

Below, the descriptions will be given based on a node corresponding to, but is not limited to, an electronic device, but nodes may be various entities. For example, cryptographic communication may be required between intellectual properties (IPs) within a system on chip (SoC). In this case, the cryptographic communication system 1000 may be implemented in the SoC. In this case, IPs of FIG. 1 may be entities for performing cryptographic communication.

The first to third electronic devices ED1, ED2, and ED3 belonging to the first domain 100 of the cryptographic communication system 1000 may execute a blockchain wallet. In general, the "blockchain wallet" may mean a means that stores a value in an electronic device in an electronic method and enables online or offline transactions without an exchange of a commodity money. Below, the blockchain-based PKI will be described on the basis of an operation of the first electronic device ED1. Operations to be described below may be performed even at any other nodes such as the second electronic device ED2 or the third electronic device ED3.

The first electronic device ED1 may generate a private key, a public key, a transaction, and a certificate by using the blockchain wallet, and the blockchain wallet may be a program that is used in the foregoing generation operation. The blockchain wallet may be implemented at the first electronic device ED1 through software including program codes or hardware storing program codes. The private key may be present only in the first electronic device ED1, and the public key may be present in all electronic devices (e.g., the second electronic device ED2 and the third electronic device ED3) within the first domain 100.

The certificate generated by the first electronic device ED1 may be a document indicating an identity of the first electronic device ED1. The certificate may include information about, for example, an identifier (ID) of the first electronic device ED1 and a public key of the first electronic device ED1. The certificate will be more fully described with reference to FIG. 3.

The transaction generated by the first electronic device ED1 may be a character string which contains information about a transaction that the first electronic device ED1 requests from the blockchain network 110. The transaction may include information that allows the first electronic device ED1 to be registered at a node of the blockchain network 110. The transaction may include the ID of the first electronic device ED1, information about the public key of the first electronic device ED1, and a command that the first electronic device ED1 requests from the blockchain network 110. The transaction will be more fully described with reference to FIG. 4.

To register the public key at the blockchain network 110, the first electronic device ED1 may output the transaction and the certificate to the blockchain network 110. A node (or an electronic device) connected with the blockchain network 110 may perform a verification operation on the output transaction and certificate. The node that completes the verification operation may generate a block BLK1 including the transaction. The generated block BLK1 may be added to the distributed ledger 111, and any other nodes may share the transaction through the distributed ledger 111. Through the above registrations, first to fifth blocks BLK1, BLK2, BLK3, BLK4, and BLK5 illustrated in FIG. 1 may be added to the distributed ledger 111, and a blockchain may be formed. Each of nodes may store at least a part of the blocks BLK1 to BLK5.

Nodes connected with the blockchain network 110 may perform cryptographic communication based on the transaction registered at the distributed ledger 111. For example, the first electronic device ED1 may encrypt a message by using a private key. In this case, any other nodes (e.g., the second electronic device ED2) may decrypt the encrypted message by using a public key registered at the distributed ledger 111. Encrypting a message with a private key may mean signing the message with the private key. The first electronic device ED1 may encrypt a message in various manners such as a Diffie-Hellman key exchange manner, a Rivest-Shamir-Adleman (RSA) manner, a Rabin manner, but the encryption manners are not limited thereto.

Referring to the second domain 200, the cryptographic communication system 1000 includes a root CA RCA1 for a CA-based PKI, an intermediate CA ICA1, CAs CA1, CA2 and CA3, and electronic devices ED4, ED5 and ED6. The root CA RCA1 may be a trust anchor in the second domain 200, and a certificate of the root CA RCA1 may be self-signed with a private key of the root CA RCA1. The root CA RCA1 may issue a certificate of the intermediate CA ICA1. The intermediate CA ICA1 may issue certificates of the CAs CA1 to CA3. Each of the CAs CA1 to CA3 may issue certificates of the electronic devices ED4 to ED6. That is, the second domain 200 of the cryptographic communication system 1000 may perform cryptographic communication through a hierarchical trust certification chain.

Referring to the third domain 300, the cryptographic communication system 1000 includes a root CA RCA2 for a CA-based PKI, an intermediate CA ICA2, Cas CA4, CA5 and CA6, and electronic devices ED7, ED8 and ED9. Like the second domain 200, the third domain 300 of the cryptographic communication system 1000 may perform cryptographic communication through a hierarchical trust certification chain.

The electronic devices ED4 to ED6 belonging to the second domain 200 may mutually check certificates and public keys included in the certificates through the certification chain formed by the CAs CA1 to CA3 and the intermediate CA ICA1. However, in the case where an upper CA allowing the second domain 200 and the third domain 300 to perform mutual certification does not exist, the electronic devices ED4 to ED6 belonging to the second domain 200 may fail to perform cryptographic communication with the electronic devices ED7 to ED9 belonging to the third domain 300. This issue may also occur in a relationship between the first domain 100 and the second domain 200, and a relationship between the first domain 100 and the third domain 300.

The cryptographic communication system 1000 according to the embodiment may register the first intermediate CA ICA1 being an intermediate CA of the second domain 200 and the second intermediate CA ICA2 being an intermediate CA of the third domain 300 as nodes of the blockchain network 110. In this case, through the blockchain network 110, the electronic devices ED1 to ED3 of the first domain 100, the electronic devices ED4 to ED6 of the second domain 200, and the electronic devices ED7 to ED9 of the third domain 300 may mutually perform cryptographic communication. However, mutual certification between the electronic devices ED4 to ED6 of the second domain 200 and electronic devices of any other domain may be performed by the first intermediate CA ICA1. The reason is that the electronic devices ED4 to ED6 of the second domain 200 are not members of the blockchain network 110. An operation for cryptographic communication of different domains will be described in detail later.

Figure 2:
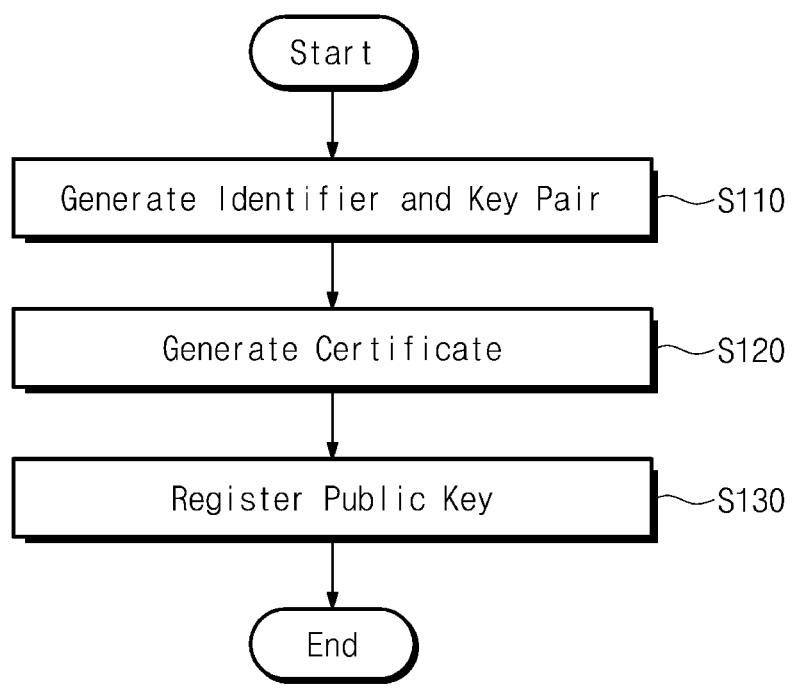
FIG. 2 is a flowchart of a method for registering as a node of a blockchain network, in a cryptographic communication system of FIG. 1, according to an embodiment.

FIG. 2 is a flowchart of a method for registering as a node of a blockchain network, in a cryptographic communication system of FIG. 1. Through operations of FIG. 2, the first intermediate CA ICA1 of FIG. 1 representing the second domain 200 may be registered as a node of the blockchain network 110, and the second intermediate CA ICA2 representing the third domain 300 may be registered as a node of the blockchain network 110. For convenience of description, respective operations of FIG. 2 will be described for the first intermediate CA ICA1.

In operation S110, the first intermediate CA ICA1 may generate an identifier ID and a pair of a public key and a private key. The ID may be an identifier of the first intermediate CA ICA1, and may be included in a certificate. The public key of the first intermediate CA ICA1 may be open to nodes of the blockchain network 110 of FIG. 1, and is included in the certificate. The private key of the first intermediate CA ICA1 may be open only to the first intermediate CA ICA1.

In operation S120, the first intermediate CA ICA1 may generate a certificate based on the ID and the pair of the public key and the private key generated in operation S110.

The first intermediate CA ICA1 may generate a to-be-signed certificate including the ID, the public key, and information about the certificate, that is, identity information. The information about the certificate may include an issuer of the certificate, a validity period of the certificate, additional private information, etc. The first intermediate CA ICA1 may generate the certificate by self-signing the identity information with the private key. For example, the first intermediate CA ICA1 may encrypt a hash value of the identity information with the private key to generate a signature for the identity information. The first intermediate CA ICA1 may generate the certificate complying with the X.509 certificate format, but a certificate format is not limited thereto.

In operation S130, the first intermediate CA ICA1 may generate a transaction for the purpose of registering the public key corresponding to the first intermediate CA ICA1. The transaction may include a registration message and a signature for the registration message. The registration message may include the ID, a registration command, the public key, and a hash value of the certificate. The signature for the registration message may be generated by encrypting the hash value with the private key.

In operation S130, the first intermediate CA ICA1 may output the transaction and the certificate to the blockchain network 110 to request registration. A node (also referred to as a "miner") of the blockchain network 110 may check whether to register the first intermediate CA ICA1. To this end, the miner may verify a signature of the received transaction, a signature of the received certificate, and the ID, the public key, and the hash value identity between the certificate and the transaction. When it is determined that it is possible to register the first intermediate CA ICA1, the miner may add the transaction to the distributed ledger 111 as a new block (e.g., the second block BLK2 of FIG. 1). Nodes of the blockchain network 110 may share the updated distributed ledger 111.

Figure 3:
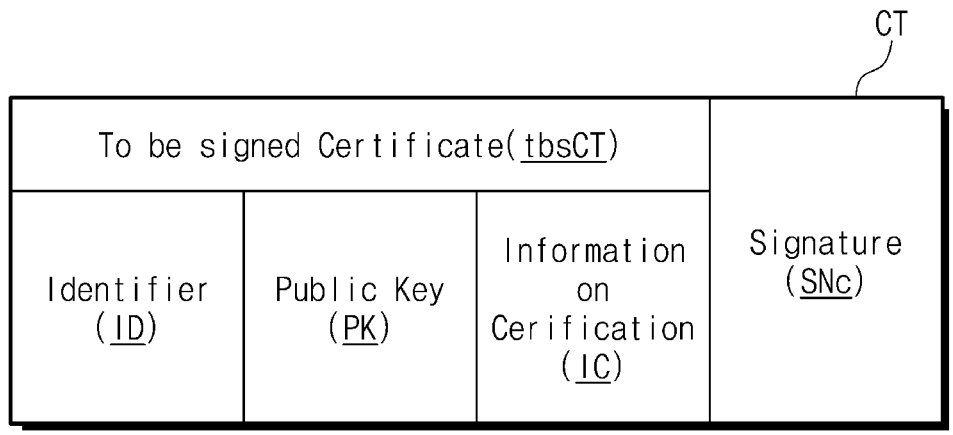
FIG. 3 is a conceptual diagram for describing a certificate described in FIGS. 1 and 2, according to an embodiment.

FIG. 3 is a conceptual diagram for describing a certificate described in FIGS. 1 and 2. Referring to FIG. 3, a certificate CT may include a to-be-signed certificate, that is, identity information tbsCT and a signature SNc. The identity information tbsCT may include an identifier ID, a public key PK, and information IC on the certificate CT.

For example, the certificate CT may comply with the X.509 certificate format. Here, X.509 is an International Telecommunication Union-Telecommunication (ITU-T) standard, which is based on a PKI, from among standards of a public key certificate and a certification algorithm. The X.509 certificate may indicate a PKI certificate of the Internet Engineering Task Force (IETF) and a Client Responsible Individual (CRI) profile of an X.509 v.3 certificate standard, and may be defined in [RFC 3280]. However, the inventive concept is not limited thereto. For example, the first intermediate CA ICA1 may generate a certificate that complies with standards of any other authentication algorithm.

The identifier ID may be identification information about an electronic device corresponding to the certificate CT. For example, in the case where the first intermediate CA ICA1 intends to register the public key PK at the blockchain network 110, a device that issues the certificate CT is the first intermediate CA ICA1. As such, in the X.509 certificate, the ID of the first intermediate CA ICA1 may be present in a subject field indicating an owner of the certificate CT.

In the case where the public key PK is registered at the blockchain network 110, the public key PK may be open to nodes. The public key PK may be used in verification by a node of the blockchain network 110. In the X.509 certificate, the public key PK may be present in a public key information field.

The information IC on the certificate CT may include a variety of information associated with the certificate CT. In the X.509 certificate, the information IC on the certificate CT may include a hash algorithm and/or a hash function used for a signature present in a signature algorithm ID field, a validity period present in a validity period field, information about a CA issuing the certificate CT present in an issuer field, and private information present in an extension field.

The signature SNc may be generated by encrypting the hash value of the identity information tbsCT with a private key. That is, a hash value that is generated by applying the identity information tbsCT to a hash function may be encrypted with the private key. For example, the first intermediate CA ICA1 may generate the signature SNc by using the private key of the first intermediate CA ICA1.

Figure 4:
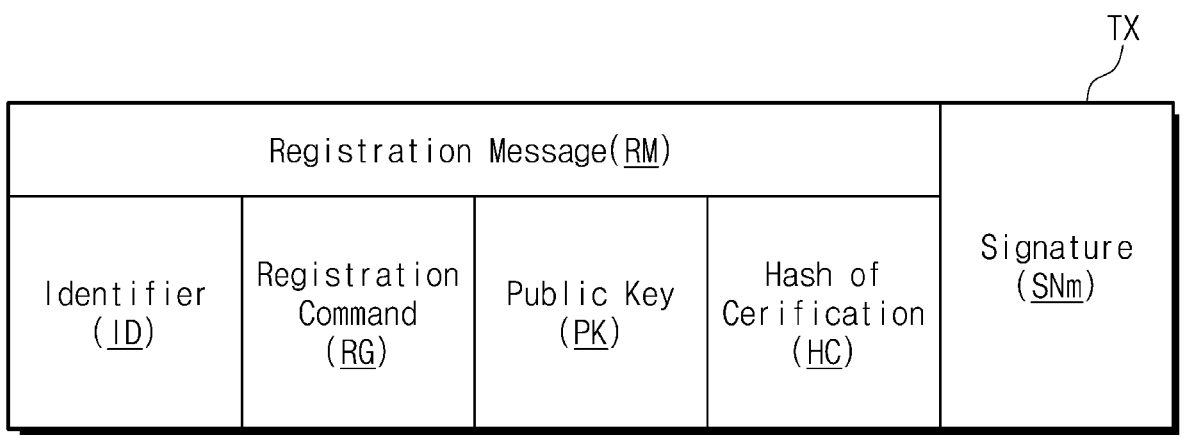
FIG. 4 is a conceptual diagram for describing a transaction described in FIGS. 1 and 2, according to an embodiment.

FIG. 4 is a conceptual diagram for describing a transaction described in FIGS. 1 and 2. Referring to FIG. 4, a transaction TX may include a registration message RM and a signature SNm. The registration message RM may include an ID, a registration command RG, a public key PK, and a hash value HC of a certificate. Here, the description will be given based on the transaction TX being necessary for registration, but the transaction TX may include various messages for updating, revoking, and extending a registered public key, depending on a command.

The signature SNm may be generated by encrypting a hash value of the registration message RM with a private key. That is, a hash value that is generated by applying the registration message RM to a hash function may be encrypted with the private key. For example, the first intermediate CA ICA1 may generate the signature SNm by using the private key of the first intermediate CA ICA1.

Figure 5:
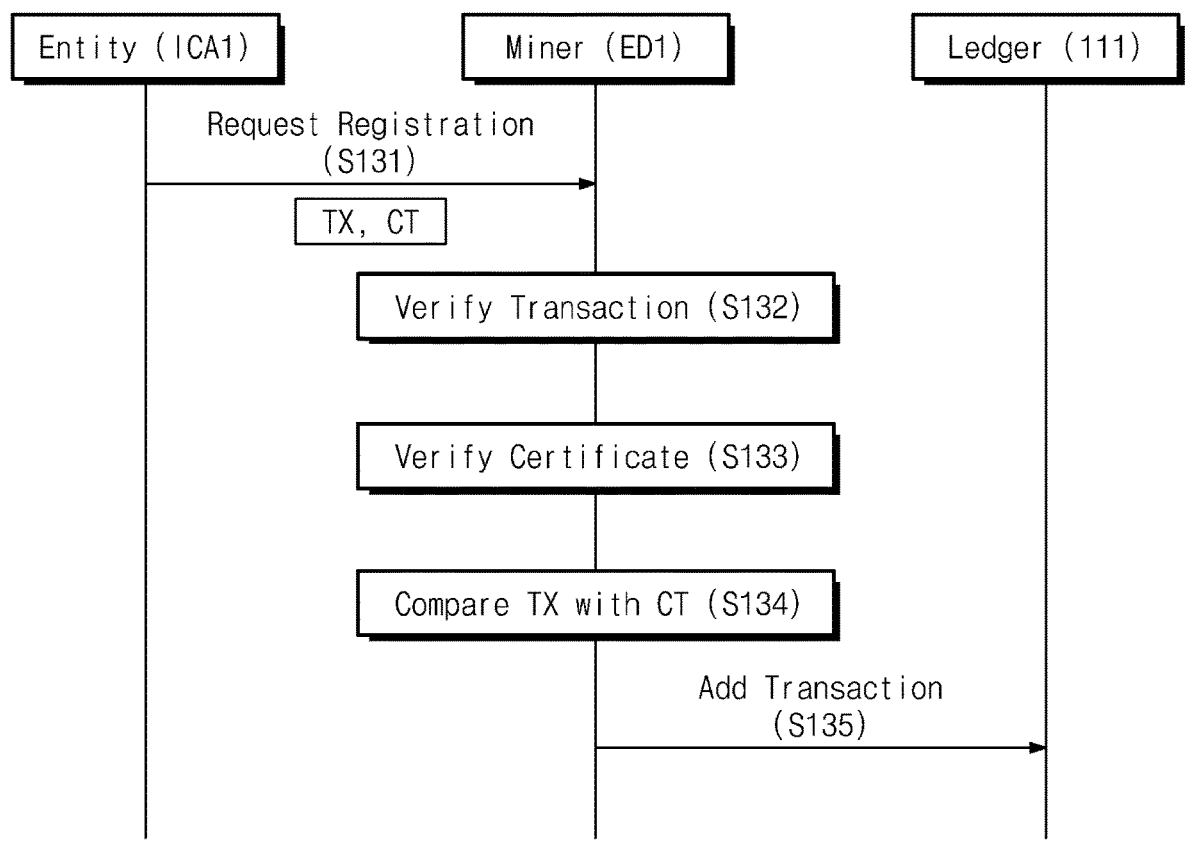
FIG. 5 is a flowchart illustrating operation S130 of FIG. 2 in detail, according to an embodiment.

FIG. 5 is a flowchart illustrating operation S130 of FIG. 2 in detail. Referring to FIG. 5, the first intermediate CA ICA1 of FIG. 1 may be registered as a member of the blockchain network 110 to represent the second domain 200, and, in an embodiment, the first electronic device ED1, that is a miner, may check whether it is possible to register the first intermediate CA ICA1 as a member of the blockchain network 110. In FIG. 5, the distributed ledger 111 is indicated as a component separate from the first intermediate CA ICA1 and the first electronic device ED1, but it may be understood that the distributed ledger 111 is distributed to nodes of the blockchain network 110.

In operation S131, the first intermediate CA ICA1 may request registration at the blockchain network 110. To this end, the first intermediate CA ICA1 may generate the transaction TX for registration. The transaction TX for registration may include a registration command as described with reference to FIG. 4. The first intermediate CA ICA1 may output the certificate CT and the transaction TX to the blockchain network 110.

In operation S132, the first electronic device ED1 may verify the signature of the transaction TX. For example, the first electronic device ED1 may extract the public key (e.g., PK of FIG. 4) from the transaction TX. The first electronic device ED1 may decrypt the signature (e.g., SNm of FIG. 4) of the transaction TX by using the extracted public key PK. A hash value of the registration message (e.g., RM of FIG. 4) may be generated as a decryption result. The first electronic device ED1 may hash the registration message RM of the transaction TX to generate a hash value. The first electronic device ED1 may compare the hash value according to the hash operation and the hash value generated according to the decryption. When the two hash values coincide with each other, the first electronic device ED1 may determine that the corresponding verification succeeds.

In operation S133, the first electronic device ED1 may verify the signature of the certificate CT. For example, the first electronic device ED1 may decrypt the signature (e.g., SNc of FIG. 3) of the certificate CT by using the public key PK included in the certificate CT. A hash value of the identity information (e.g., tbsCT of FIG. 3) may be generated as a decryption result. The first electronic device ED1 may hash the identity information tbsCT of the certificate CT to generate a hash value. The first electronic device ED1 may compare the hash value according to the hash and the hash value generated according to the decryption. When the two hash values coincide with each other, the first electronic device ED1 may determine that the corresponding verification succeeds.

In operation S134, the first electronic device ED1 may check whether information of the transaction TX and information of the certificate CT coincide with each other. For example, the first electronic device ED1 may determine whether the identifier ID and the public key PK included in the transaction TX are identical to the identifier ID and the public key PK included in the certificate CT. For example, the first electronic device ED1 may determine whether a hash value (e.g., HC of FIG. 4) of a certificate included in the transaction TX is identical to a hash value generated by hashing the certificate CT. When the information of the transaction TX and the information of the certificate CT coincide with each other, the first electronic device ED1 may determine that the corresponding verification succeeds.

When the verification operations respectively corresponding to operation S132 to operation S134 succeed, operation S135 may be performed. In operation S135, the first electronic device ED1 may add the transaction TX to the distributed ledger 111 as a new block (e.g., the second block BLK2 of FIG. 1) of a blockchain. As such, the first intermediate CA ICA1 may be registered as a node of the blockchain network 110. The updated distributed ledger 111 may be shared by all nodes. When the verification operations respectively corresponding to operation S132 to operation S134 fail, operation S135 may not be performed, and the transaction TX and the certificate CT may be revoked.

Figure 6:
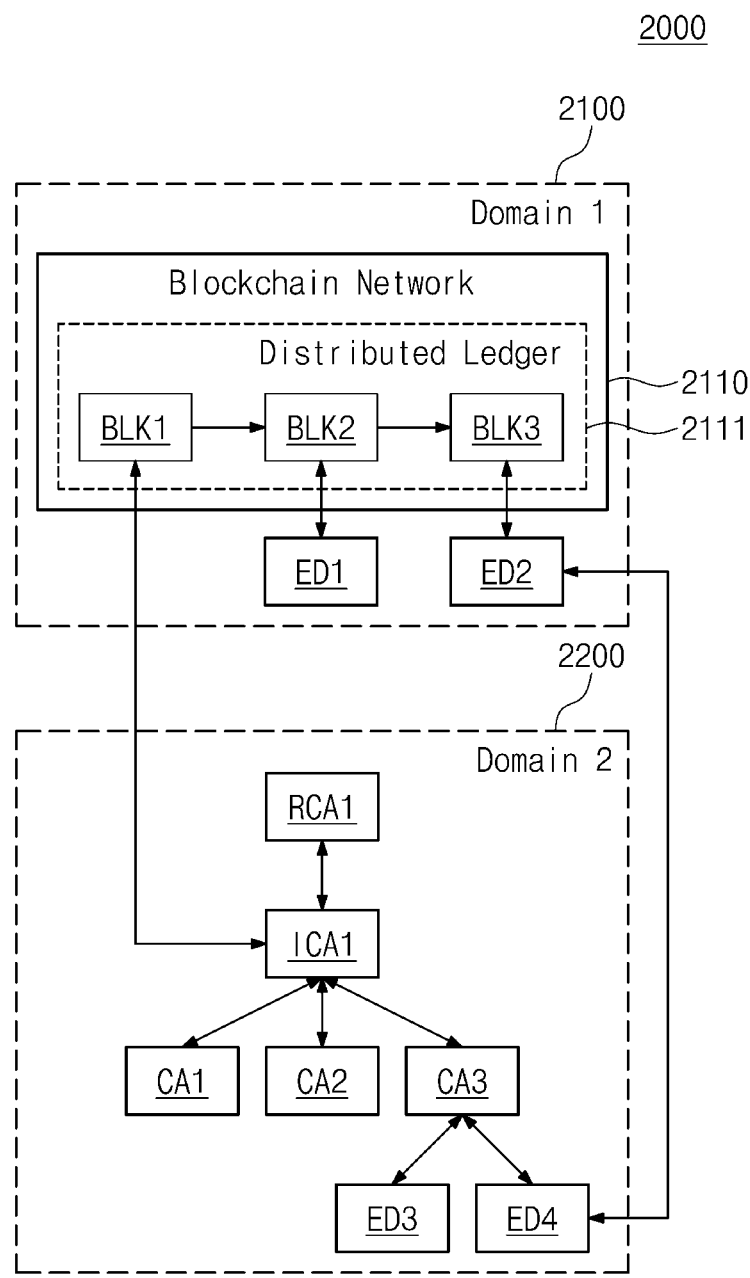
FIG. 6 is a block diagram for describing a procedure in which electronic devices in a cryptographic communication system of FIG. 1 perform mutual certification, according to an embodiment.

FIG. 6 is a block diagram for describing a procedure in which electronic devices in the cryptographic communication system of FIG. 1 perform mutual certification. Referring to FIG. 6, it may be understood that a first domain 2100 is a blockchain-based PKI domain and a second domain 2200 is a CA-based PKI domain. A cryptographic communication system 2000 includes a blockchain network 2110 for a PKI of the first domain 2100. A distributed ledger 2111 is implemented at the blockchain network 2110.

The cryptographic communication system 2000 may include CAs RCA1, ICA1, CA1, CA2, and CA3 for a PKI of the second domain 2200. For example, the intermediate CA ICA1 may be a node that is registered through the first block BLK1 of the blockchain network 2110. For example, the first and second electronic devices ED1 and ED2 may be nodes that are registered through the second and third blocks BLK2 and BLK3 of the blockchain network 2110. The intermediate CA ICA1 may deputize for the third and fourth electronic devices ED3 and ED4 to perform mutual certification with the first and second electronic devices ED1 and ED2. In an embodiment, how to perform cryptographic communication between the second electronic device ED2 of the first domain 2100 and the fourth electronic device ED4 of the second domain 2200 will be described below.

Figure 7:
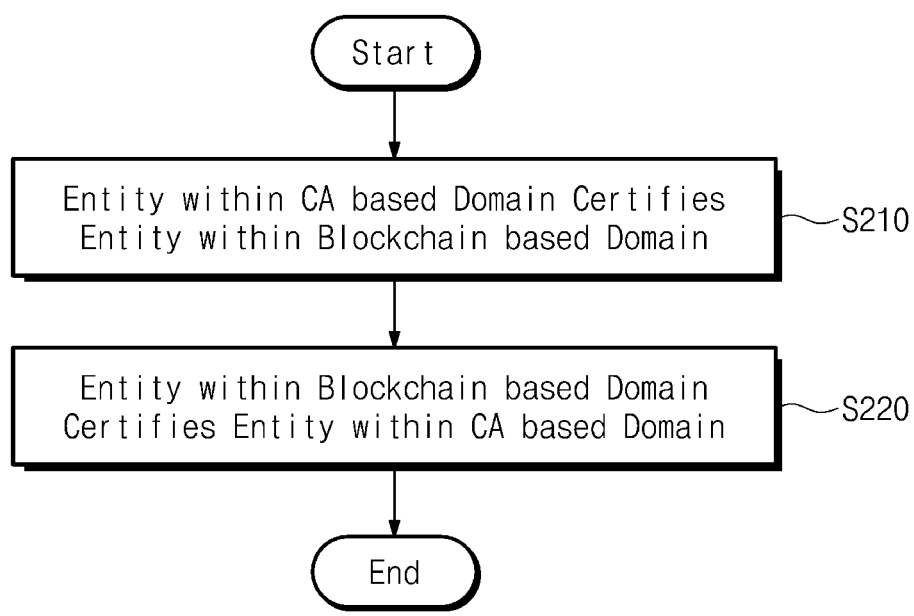
FIG. 7 is a flowchart of a method for performing mutual certification between an entity belonging to a CA-based PKI domain and an entity belonging to a blockchain-based PKI domain, according to an embodiment.

FIG. 7 is a flowchart of a method for performing mutual certification between an entity belonging to a CA-based PKI domain and an entity belonging to a blockchain-based PKI domain. Through respective operations of FIG. 7, an entity (e.g., the second electronic device ED2 of FIG. 6) of the first domain 2100 and an entity (e.g., the fourth electronic device ED4 of FIG. 6) of the second domain 2200 may perform cryptographic communication. An order of operation S210 and operation S220 illustrated in FIG. 7 is only an example, and operation S210 and operation S220 may be interchangeable.

For mutual certification, the condition that at least one entity belonging to the CA-based PKI domain is a node of the blockchain network 2110 is required. It is described above how the intermediate CA ICA1 belonging to the second domain 2200 is registered as a node of the blockchain network 2110. Thus, electronic devices belonging to the second domain 2200 of FIG. 6 and electronic devices belonging to the first domain 2100 of FIG. 6 may perform mutual certification.

In operation S210, an entity belonging to the CA-based PKI domain (e.g., the second domain 2200 of FIG. 6) may certify an entity belonging to the blockchain-based PKI domain (e.g., the first domain 2100 of FIG. 6). In FIG. 6, the third and fourth electronic devices ED3 and ED4 of the second domain 2200 are not members of the blockchain network 2110. Accordingly, for the third and fourth electronic devices ED3 and ED4 to perform cryptographic communication with electronic devices in any other domain, the intermediate CA ICA1 instead of the third and fourth electronic devices ED3 and ED4, may certify the electronic devices in the other domain. And then, the intermediate CA ICA1 may inform entities of a lower layer, that is, the third and fourth electronic devices ED3 and ED4, of a certification result.

In operation S220, the entity belonging to the blockchain-based PKI domain (e.g., the first domain 2100 of FIG. 6) may certify the entity belonging to the CA-based PKI domain (e.g., the second domain 2200 of FIG. 6). The CA-based PKI domain is a PKI centralized through a hierarchical trust certification chain. Accordingly, the first and second electronic devices ED1 and ED2 of the first domain 2100 may verify a certificate of the intermediate CA ICA1 which is a node of the blockchain network 2110, and may then certificates of the entities of the lower layer.

Figure 8:
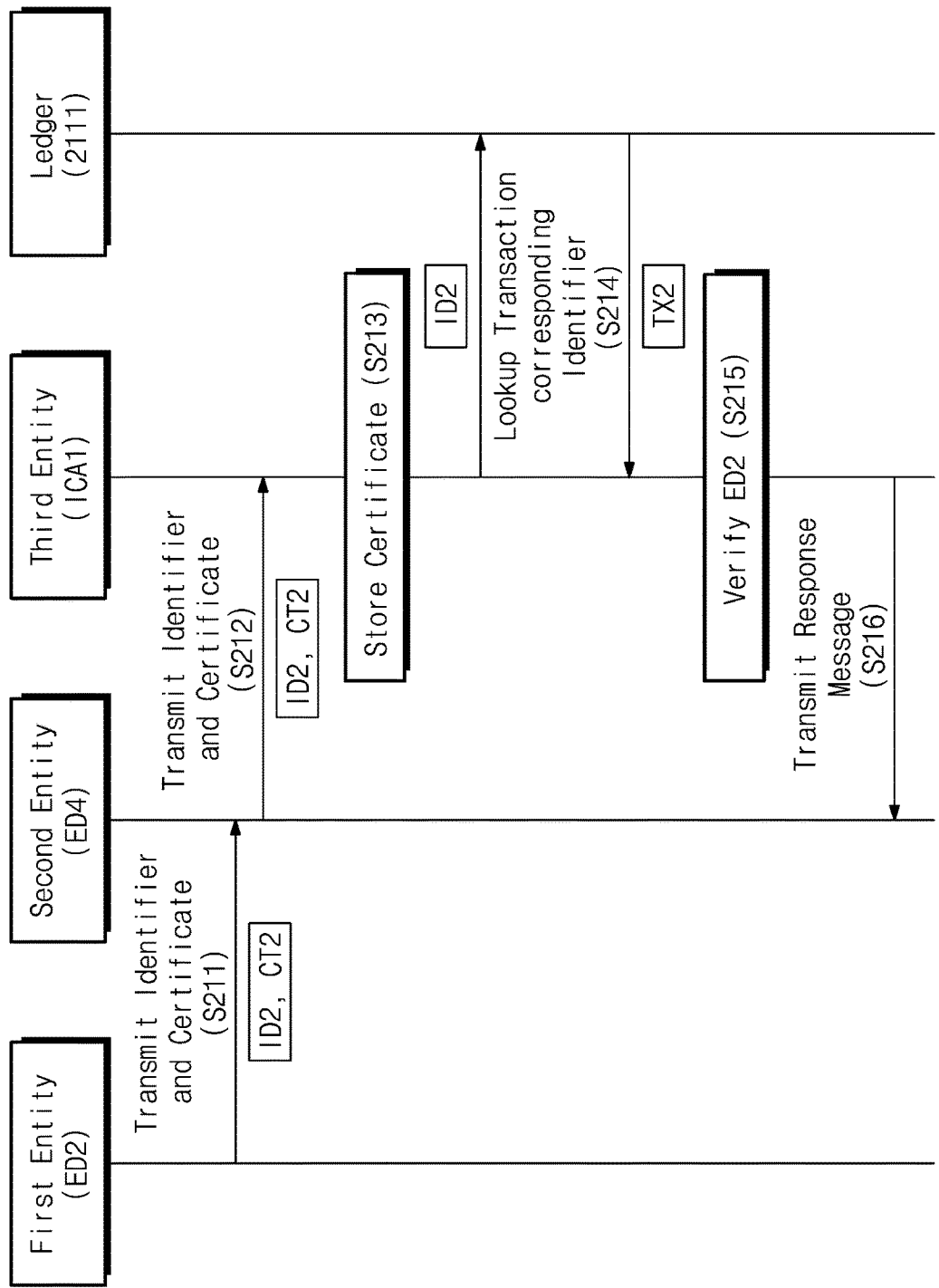
FIG. 8 is a flowchart illustrating operation S210 of FIG. 7 in detail, according to an embodiment.

FIG. 8 is a flowchart illustrating operation S210 of FIG. 7 in detail. Referring to FIGS. 6 and 8, in place of the fourth electronic device ED4, the intermediate CA ICA1 belonging to the CA-based PKI domain may certify the second electronic device ED2. The second electronic device ED2 belongs to the blockchain-based PKI domain. In FIG. 8 the distributed ledger 2111 is indicated as a separate component, but it may be understood that the distributed ledger 2111 is distributed to nodes of the blockchain network 2110.

In operation S211, for cryptographic communication, the fourth electronic device ED4 may request identification from the second electronic device ED2. In response to the request for the identification, the second electronic device ED2 may transmit an identifier ID2 and a certificate CT2 to the fourth electronic device ED4.

In operation S212, the fourth electronic device ED4 may transmit the received identifier ID2 and the received certificate CT2 to the intermediate CA ICA1. Because the fourth electronic device ED4 is not a member of the blockchain network 2110, the intermediate CA ICA1 may certify the second electronic device ED2.

In operation S213, the intermediate CA ICA1 may store the certificate CT2 of the second electronic device ED2. The certificate CT2 may be stored in a memory of the intermediate CA ICA1, and when verifying the certificate CT2 of the second electronic device ED2, the intermediate CA ICA1 may verify the stored certificate CT2.

In operation S214, the intermediate CA ICA1 may look up a transaction TX2 corresponding to the second electronic device ED2 at the distributed ledger 2111. The intermediate CA ICA1 may look up the transaction TX2 by using the identifier ID2 received from the fourth electronic device ED4. As described above, because the transaction TX2 includes a registration message including the identifier ID2 and a public key, the transaction TX2 may be found by using the received identifier ID2.

In operation S215, the intermediate CA ICA1 may verify the second electronic device ED2, based on the transaction TX2 found in operation S214 and the certificate CT2 stored in operation S213. The second electronic device ED2 may be verified in the same manner as described in operation S132 to operation S134 of FIG. 5.

For example, in operation S215, the intermediate CA ICA1 may verify a signature of the transaction TX2. The intermediate CA ICA1 may decrypt the signature of the transaction TX2 by using the public key. A hash value of the registration message included in the transaction TX2 may be generated as a decryption result. The intermediate CA ICA1 may hash the registration message of the transaction TX2 to generate a hash value. The intermediate CA ICA1 may verify the signature of the transaction TX2 by comparing the hash value according to the decryption with the hash value according to the hash operation.

Also, in operation S215, the intermediate CA ICA1 may verify a signature of the certificate CT2 stored in operation S213. The intermediate CA ICA1 may decrypt the signature of the certificate CT2 by using the public key. A hash value of identity information may be generated as a decryption result. The intermediate CA ICA1 may hash the identity information of the certificate CT2 to generate a hash value. The intermediate CA ICA1 may verify the signature of the certificate CT2 by comparing the hash value according to the decryption with the hash value according to the hash operation.

Further, in operation S215, the intermediate CA ICA1 may determine whether the identifier ID2 and the public key included in the transaction TX2 are identical to the identifier ID2 and the public key included in the certificate CT2. Also, the intermediate CA ICA1 may determine whether a hash value of a certificate included in the transaction TX2 is identical to the hash value generated by hashing the certificate CT2. Through the above operations, whether the certificate CT2 corresponds to the second electronic device ED2 may be verified.

In operation S216, the intermediate CA ICA1 may transmit a response message to the fourth electronic device ED4. The response message may include the identifier of the intermediate CA ICA1, a verification result of the certificate CT2, and a signature associated with the response message. The signature associated with the response message may be generated by encrypting, at the intermediate CA ICA1, a hash value of the response message with a private key. The signature associated with the response message may be included in the response message for the purpose of verifying certification and integrity of the response message.

The fourth electronic device ED4 may verify the signature of the received response message. The fourth electronic device ED4 may possess a certificate of the intermediate CA ICA1 through a trust certification chain. As such, the fourth electronic device ED4 may extract the public key of the intermediate CA ICA1 from the certificate of the intermediate CA ICA1. The fourth electronic device ED4 may verify the signature of the response message by decrypting the signature of the response message by using the public key. A way to verify a signature by using a public key is identical to that described in operation S133.

Figure 9:
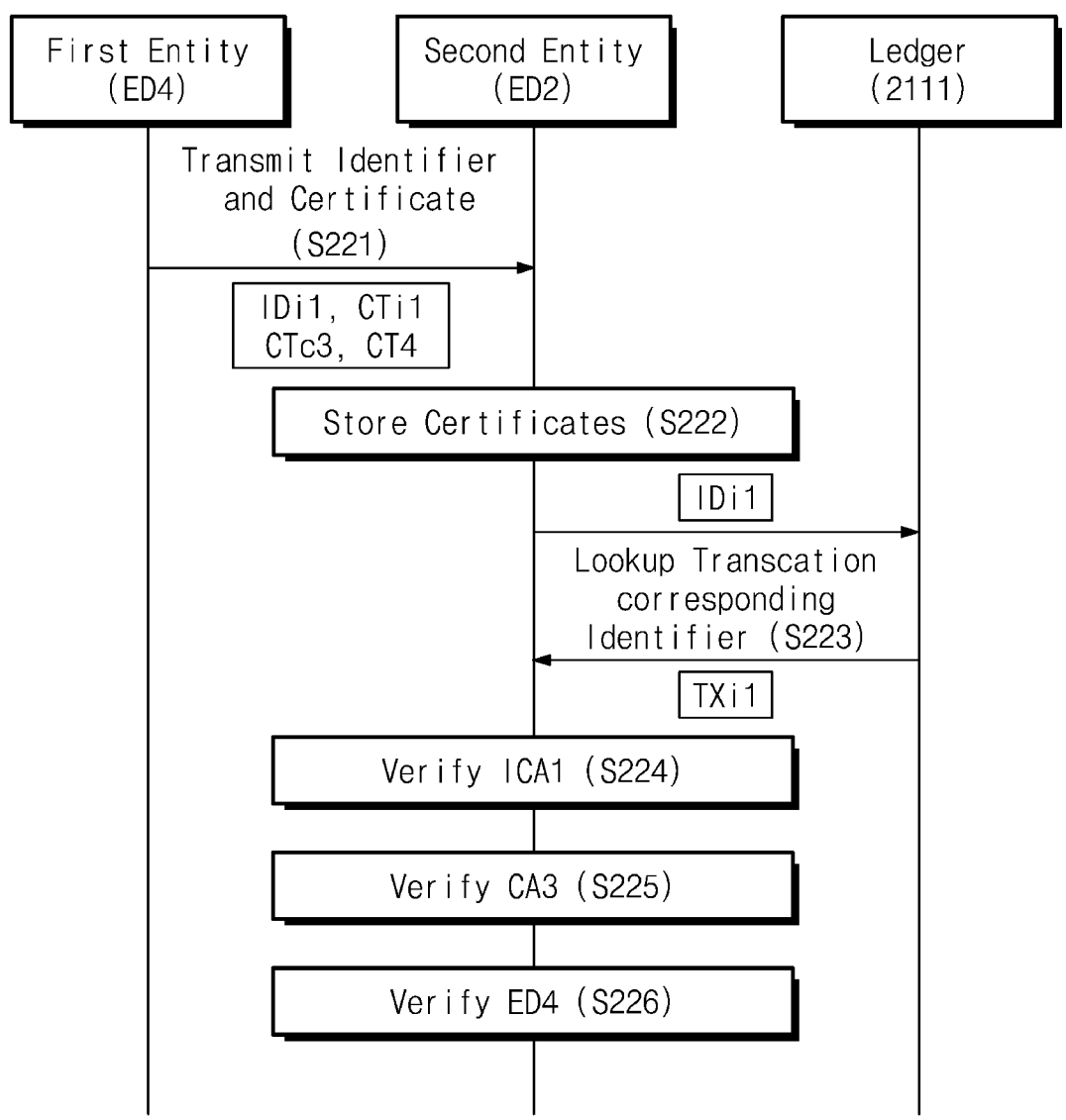
FIG. 9 is a flowchart illustrating operation S220 of FIG. 7 in detail, according to an embodiment.

FIG. 9 is a flowchart illustrating operation S220 of FIG. 7 in detail. Referring to FIGS. 6 and 9, the second electronic device ED2 belonging to the blockchain-based PKI domain may certify the fourth electronic device ED4 belonging to the CA-based PKI domain. Before certifying the fourth electronic device ED4, the second electronic device ED2 may certify the intermediate CA ICA1 and the third CA CA3 forming a trust certification chain. In FIG. 9 the distributed ledger 2111 is indicated as a separate component, but it may be understood that the distributed ledger 2111 is distributed to nodes of the blockchain network 2110.

In operation S221, for cryptographic communication, the second electronic device ED2 may request identification from the fourth electronic device ED4. In response to the request for the identification, the fourth electronic device ED4 may transmit an identifier IDi1 and a certificate CTi1 of the intermediate CA ICA1, a certificate CTc3 of the third CA CA3, and a certificate CT4 of the fourth electronic device ED4 to the second electronic device ED2. The fourth electronic device ED4 may possess the identifier IDi1 and the certificate CTi1 of the intermediate CA ICA1, and the certificate CTc3 of the third CA CA3. As such, the identifier IDi1 and the certificate CTi1 of the intermediate CA ICA1 that is a member of the blockchain network 2110, and the certificate CTc3 of the third CA CA3 that forms the trust certification chain may be required to certify the fourth electronic device ED4.

In operation S222, the second electronic device ED2 may store the certificates CTi1, CTc3, and CT4 received from the fourth electronic device ED4. The certificates CTi1, CTc3, and CT4 may be stored in a memory of the second electronic device ED2, and may be used when the certificates CTi1, CTc3, and CT4 are verified.

In operation S223, the second electronic device ED2 may look up a transaction TXi1 corresponding to the intermediate CA ICA1 at the distributed ledger 2111. The second electronic device ED2 may look up the transaction TXi1 corresponding to the intermediate CA ICA1 by using the identifier IDi1 of the intermediate CA ICA1 received from the fourth electronic device ED4. As described above, because the transaction TXi1 includes a registration message including the identifier IDi1 and a public key, the transaction TXi1 may be found by using the received identifier IDi1.

In operation S224, the second electronic device ED2 may verify the intermediate CA ICA1, based on the transaction TXi1 found in operation S223 and the certificate CTi1 of the intermediate CA ICA1 stored in operation S222. The intermediate CA ICA1 may be verified in the same manner as described in operation S132 to operation S134 of FIG. 5 and in operation S215 of FIG. 8. For example, the verification operation may include verifying a signature of the transaction TXi1, verifying a signature of the certificate CTi1, determining whether an identifier ID2 and a public key included in the transaction TXi1 are identical to an identifier ID2 and a public key included in the certificate CTi1, and determining whether a hash value of a certificate included in the transaction TXi1 is identical to a hash value generated by hashing the certificate CTi1.

In operation S225, the second electronic device ED2 may verify the third CA CA3, based on the certificate CTc3 of the third CA CA3 stored in operation S222. A public key is required to verify the certificate CTc3 of the third CA CA3. The certificate CTc3 of the third CA CA3 may be signed by using a private key of the intermediate CA ICA1, depending on the CA-based PKI. As such, the second electronic device ED2 may decrypt the certificate CTc3 of the third CA CA3 by using the public key of the intermediate CA ICA1. The public key of the intermediate CA ICA1 may be extracted from the certificate CTi1 of the intermediate CA ICA1. As such, certification of the certificate CTc3 described in operation S133 is possible.

In operation S226, the second electronic device ED2 may verify the fourth electronic device ED4, based on the certificate CT4 of the fourth electronic device ED4 stored in operation S222. A public key is required to verify the certificate CT4 of the fourth electronic device ED4. The certificate CT4 of the fourth electronic device ED4 may be signed by using a private key of the third CA CA3, depending on the CA-based PKI. As such, the second electronic device ED2 may decrypt the certificate CT4 of the fourth electronic device ED4 by using a public key of the third CA CA3. The public key of the third CA CA3 may be extracted from the certificate CTc3 of the third CA CA3. As such, certification of the certificate CT4 described in operation S133 is possible.

Figure 10:
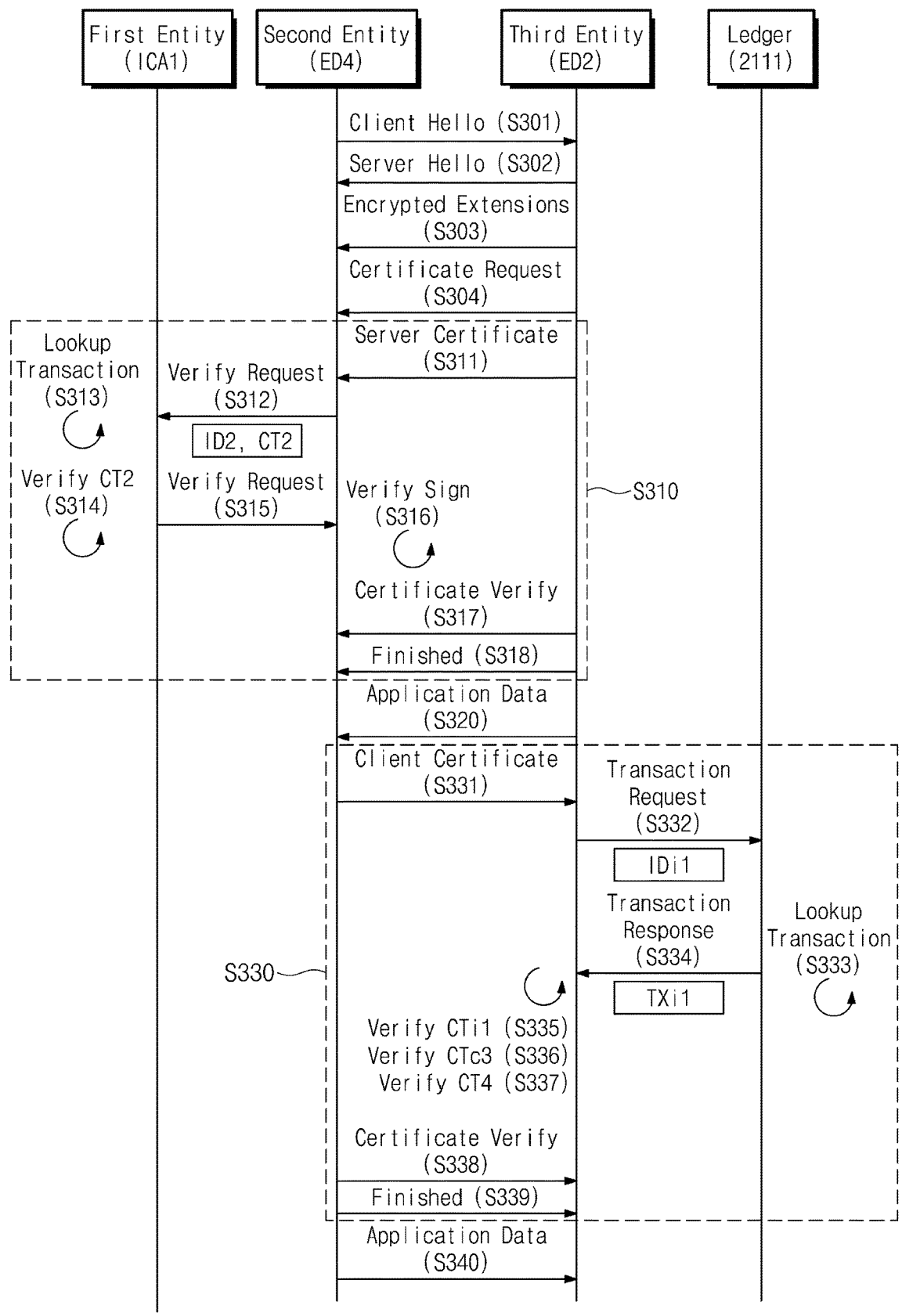
FIG. 10 is a flowchart illustrating a detailed process in which entities in a cryptographic communication system of FIGS. 1 and 6 perform mutual certification, according to an embodiment.

FIG. 10 is a flowchart illustrating a detailed process in which entities in a cryptographic communication system of FIGS. 1 and 6 perform mutual certification. Each of the cryptographic communication systems 1000 and 2000 of FIGS. 1 and 6 may perform communication based on a secure sockets layer (SSL)/a transport layer security (TLS). The SSL/TLS is a standard cryptographic protocol for protecting data exchanged when communicating on the Internet. Because the SSL/TLS is a cryptographic manner of a transport layer, the SSL/TLS may be available regardless of a protocol kind of an application layer, such as FTP or XMPP, as well as HTTP. The communication between entities may be defined by a structure compatible with a TLS 1.3 handshake protocol. However, the inventive concept is not limited thereto. For example, the communication may be defined as a structure compatible with a protocol using a certificate such as TLS 1.2.

How identification is mutually made between entities belonging to different domains will be described below. Here, a "client" and a "server" may indicate the fourth electronic device ED4 and the second electronic device ED2, respectively. In the cryptographic communication system 100 or 2000 of FIG. 1 or 6, the fourth electronic device ED4 belongs to the second domain 200 or 2200 that is the CA-based PKI domain. In the cryptographic communication system 100 or 2000 of FIG. 1 or 6, the second electronic device ED2 belongs to the first domain 100 or 2100 that is the blockchain-based PKI domain.

In operation S301 and operation S302, the fourth electronic device ED4 and the second electronic device ED2 may exchange basic information through hello messages. For example, the fourth electronic device ED4 may transmit the following information through a client hello message: a certification algorithm, a key exchange algorithm, a hash algorithm and a cryptographic algorithm that the fourth electronic device ED4 supports. The second electronic device ED2 may transmit the following information through a server hello message: a certification algorithm, a key exchange algorithm, a hash algorithm, and a cryptographic algorithm that the second electronic device ED2 supports.

In operation S303, the second electronic device ED2 may transmit extension data to be encrypted to the fourth electronic device ED4 through an encrypted extension message. The extension data may be data that do not need to set a cryptographic context or are not associated with individual certificates.

In operation S304, the second electronic device ED2 may transmit a certificate request message to the fourth electronic device ED4 because CA-based certification is required.

In operation S310, an entity belonging to the CA-based PKI domain may certify an entity belonging to the blockchain-based PKI domain. Operation S310 may include operation S311 to operation S318. Operation S310 corresponds to operation S210 of FIG. 7.

In operation S311, the second electronic device ED2 may output the certificate CT2 to the fourth electronic device ED4. The certificate CT2 may include information about a public key of the second electronic device ED2. Operation S311 corresponds to operation S211 of FIG. 8.

In operation S312, the fourth electronic device ED4 may request the intermediate CA ICA1 to verify the second electronic device ED2, in response to receiving the certificate CT2 from the second electronic device ED2. In detail, the fourth electronic device ED4 may request a transaction indicating the identity of the second electronic device ED2 from the intermediate CA ICA1. For example, the fourth electronic device ED4 may transmit the certificate CT2 and the identifier ID2 to the intermediate CA ICA1 together with a lookup command. Operation S312 corresponds to operation S212 of FIG. 8.

In operation S313, in response to the request of the fourth electronic device ED4, the intermediate CA ICA1 may look up the transaction corresponding to the second electronic device ED2 at the distributed ledger 2111. The intermediate CA ICA1 may look up the transaction by using the identifier ID2 received from the fourth electronic device ED4. Operation S313 corresponds to operation S214 of FIG. 8.

In operation S314, the intermediate CA ICA1 may verify the transaction found in operation S313 and the certificate CT2 received from the second electronic device ED2. For example, the verification operation may include verifying a signature of the transaction, verifying a signature of the certificate CT2, determining whether the identifier ID2 and a public key included in the transaction are identical to the identifier ID2 and a public key included in the certificate CT2, and determining whether a hash value of a certificate included in the transaction is identical to a hash value generated by hashing the certificate CT2. Operation S314 corresponds to operation S215 of FIG. 8.

In operation S315, the intermediate CA ICA1 may request the electronic device ED4 to verify a response message including a verification result of the certificate CT2. The intermediate CA ICA1 may transmit, to the fourth electronic device ED4, the verification result of the certificate CT2, and a signature associated with the response message including the verification result. The signature associated with the response message may be generated by encrypting, at the intermediate CA ICA1, a hash value of the response message with a private key. Operation S315 corresponds to operation S216 of FIG. 8.

In operation S316, the fourth electronic device ED4 may verify the signature of the received response message. The fourth electronic device ED4 may possess the certificate of the intermediate CA ICA1 through a trust certification chain. As such, the fourth electronic device ED4 may extract the public key of the intermediate CA ICA1 from the certificate of the intermediate CA ICA1. The fourth electronic device ED4 may verify the signature of the response message by decrypting the signature of the response message by using the public key.

In operation S317, the second electronic device ED2 may transmit, to the fourth electronic device ED4, a certificate verify message that is used to prove that the second electronic device ED2 possesses a private key corresponding to the certificate CT2. In operation S318, the second electronic device ED2 may finish the server hello by transmitting a completion message to the fourth electronic device ED4.

After operation S310, in operation S320, the second electronic device ED2 may transmit application data to the fourth electronic device ED4.

In operation S330, an entity belonging to the blockchain-based PKI domain may certify an entity belonging to the CA-based PKI domain. Operation S330 may include operation S331 to operation S339. Operation S330 corresponds to operation S220 of FIG. 7.

In operation S331, the fourth electronic device ED4 may output certificates to the second electronic device ED2. Here, the certificates may include the certificate CTi1 of the intermediate CA ICA1 that is a node of the blockchain network 2110, the certificate CTc3 of a CA (e.g., the third CA CA3 of FIG. 6) between the intermediate CA ICA1 and the fourth electronic device ED4, and the certificate CT4 of the fourth electronic device ED4. Operation S331 corresponds to operation S221 of FIG. 9.

In operation S332, the fourth electronic device ED4 may request a transaction associated with the intermediate CA ICA1 from the distributed ledger 2111 in response to receiving the certificates from the fourth electronic device ED4. In operation S333, the distributed ledger 2111 may look up the transaction TXi1 corresponding to the intermediate CA ICA1 in response to the transaction request. The transaction TXi1 may be found by the identifier IDi1 of the intermediate CA ICA1. In operation S334, the transaction TXi1 found in operation 333 may be provided to the second electronic device ED2. Operation S332 to operation S334 correspond to operation S223 of FIG. 9.

In operation S335, the second electronic device ED2 may verify the transaction TXi1, that is found in operation 333, and the certificate CTi1 of the intermediate CA ICA1 received from the fourth electronic device ED2. Operation S335 corresponds to operation S224 of FIG. 9.

In operation S336, the second electronic device ED2 may verify the certificate CTc3 of the third CA CA3 by using a public key of the intermediate CA ICA1 extracted from the certificate CTi1 of the intermediate CA ICA1. Operation S336 corresponds to operation S225 of FIG. 9.

In operation S337, the second electronic device ED2 may verify the certificate CT4 of the fourth electronic device ED4 by using a public key of the third CA CA3 extracted from the certificate CTc3 of the third CA CA3. Operation S337 corresponds to operation S226 of FIG. 9.

In operation S338, the fourth electronic device ED4 may transmit, to the second electronic device ED2, a certificate verify message that is used to prove that the fourth electronic device ED4 possesses a private key corresponding to the certificate CT4. In operation S339, the fourth electronic device ED4 may finish the client hello by transmitting a completion message to the second electronic device ED2.

After operation S330, in operation S340, the fourth electronic device ED4 may transmit application data to the second electronic device ED2.

Figure 11:
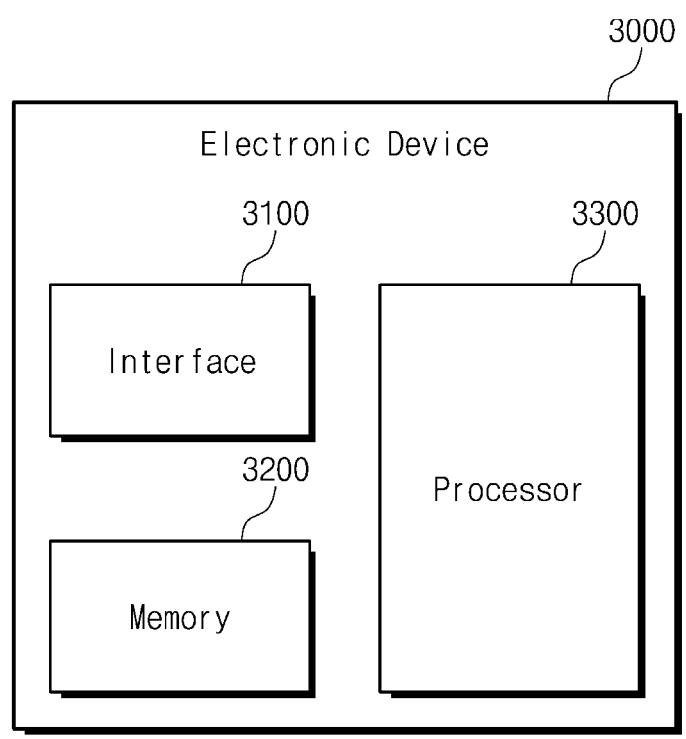
FIG. 11 is a block diagram illustrating an electronic device of FIGS. 1 and 6, according to an embodiment.

FIG. 11 is a block diagram illustrating an electronic device shown in FIGS. 1 and 6. Referring to FIG. 11, an electronic device 3000 may include an interface 3100, a memory 3200, and a processor 3300. However, all the components illustrated in FIG. 11 are not essential. The electronic device 3000 may further include any other component(s) in addition to the components illustrated in FIG. 11 or may not include one or more of the components illustrated in FIG. 11. The electronic device may represent at least one node included in the cryptographic communication systems 1000 and 2000 of FIGS. 1 and 6.

The interface 3100 may communicate with an external device. In detail, the interface 3100 may wiredly or wirelessly connect to a network to communicate with the external device. Here, the external device may be a server, a smartphone, a tablet, a personal computer (PC), a computing device, etc. The interface 3100 may include a communication module supporting one of various wired/wireless communication schemes. For example, the communication module may be in the form of a chipset or may be a sticker/barcode (e.g., a sticker including an NFC tag) including information necessary for communication. Also, the communication module may be a short range communication module or a wired communication module. The interface 3100 may perform data communication with any other electronic devices or CAs, under the cryptographic communication system 1000 or 2000 of FIG. 1 or 6.

In the case where the electronic device 3000 belongs to the blockchain-based PKI domain, the electronic device 3000 may receive a transaction and a certificate of any other electronic device or CA for the purpose of performing a verification operation of a miner through the interface 3100. Through the interface 3100, the electronic device 3000 may receive a certificate for certifying any other electronic device and may transmit a certificate such that the other electronic device certifies the electronic device 3000.

In the case where the electronic device 3000 belongs to the CA-based PKI domain, through the interface 3100, the electronic device 3000 may receive a certificate for certifying any other electronic device and may transmit a certification request and the received certificate to an upper CA. The electronic device 3000 may transmit a certificate of the electronic device 3000 and certificates of upper CAs through the interface 3100 such that any other electronic device certifies the electronic device 3000.

The memory 3200 may include a storage medium that is implemented with at least one of a flash memory, a hard disk, a multimedia card micro, an SD memory, an XD memory, a RAM (Random Access Memory), an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disc, an optical disc, etc.

In the case where the electronic device 3000 belongs to the blockchain-based PKI domain, the memory 3200 may store program codes for distributing and managing a ledger recording a transaction associated with a cryptocurrency. The memory 3200 may store program codes for executing a blockchain wallet. The memory 3200 may store at least one or more program codes for verifying a transaction and a certificate of any other electronic device. In addition, the memory 3200 may store a certificate received through the interface 3100 for the purpose of verifying any other electronic device.

In the case where the electronic device 3000 belongs to the CA-based PKI domain, the memory 3200 may store program codes for executing a cryptographic communication operation through a trust certification chain. The memory 3200 may store program codes for requesting a CA, which is a node of a blockchain network, to certify an electronic device belonging to any other domain. The memory 3200 may store certificates of CAs which form a trust certification chain such that any other electronic device certifies the CAs and the electronic device 3000.

The processor 3300 may control overall operations of the electronic device 3000 and may include at least one processor such as a central processing unit (CPU). The processor 3300 may include at least one processor specialized to correspond to each function or may be one integrated processor. The processor 3300 may execute the above operations by using the program codes and information stored in the memory 3200.

Even though an external electronic device belonging to an external domain is not registered as a node of a blockchain, an electronic device according to an embodiment, which belongs to a blockchain-based PKI domain, may certify the external electronic device by using a certificate of an upper CA registered as a node of the blockchain.

An electronic device according to the above embodiments, which belongs to a CA-based PKI domain, may perform certification and cryptographic communication with an external electronic device by requesting an upper certification authority registered as a node of the blockchain to perform verification.

A cryptographic communication system according to the above embodiments may enable cryptographic communication between different domains by using a blockchain-based PKI domain. Also, as upper CAs of various domains are registered as nodes of a blockchain network, cryptographic communication of lower entities may be possible, and thus, various domains may be easily integrated and extended through a blockchain.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. An electronic device of a first domain, which is a blockchain-based public key infrastructure (PKI) domain, the electronic device comprising:
　an interface configured to receive, from a first entity of a second domain, a first certificate of the first entity, a second certificate of a second entity of the second domain, and a third certificate of a third entity of the second domain, the first certificate having been issued by the third entity to the first entity, the third certificate having been issued by the second entity to the third entity;
　a memory configured to store the first certificate, the second certificate, and the third certificate; and
　a processor configured to:
　　look up a transaction corresponding to the second entity of the second domain at a distributed ledger of the first domain based on an identifier of the second entity, the transaction having been added to the distributed ledger based on a registration message comprising a public key of the second entity and a certificate hash value of the second certificate of the second entity, the transaction indicating that the second entity and the second certificate are registered in the distributed ledger of the first domain;
　　verify the second certificate of the second entity of the second domain based on the public key of the second entity and the certificate hash value of the second certificate of the second entity comprised by the transaction;
verify the third certificate based on verification of the second certificate, and further based on the public key of the second entity obtained from the second certificate, the third certificate not being registered in the distributed ledger of the first domain; and
verify the first certificate based on verification of the second certificate and verification of the third certificate, and further based on a public key of the third entity obtained from the third certificate, the first certificate not being registered in the distributed ledger of the first domain,
wherein the first domain is different from the second domain,
wherein the electronic device is not registered as a member of the second domain,
wherein the first entity is not registered as a member of the first domain,
wherein the second certificate of the second entity is registered in the distributed ledger of the first domain, and
wherein the third entity is not registered as a member of the first domain.

2. The electronic device of claim 1, wherein the processor is configured to verify the transaction by obtaining the public key of the second entity from the transaction, obtaining a first hash value by decrypting a signature of the transaction with the public key, obtaining a second hash value by hashing a message of the transaction, and comparing the first hash value and the second hash value.

3. The electronic device of claim 1, wherein the processor is configured to verify the second certificate by obtaining a first hash value by decrypting a signature of the second certificate with the public key of the second entity, obtaining a second hash value by hashing identity information of the second certificate, and comparing the first hash value and the second hash value.

4. The electronic device of claim 1, wherein the processor is configured to compare an identifier and a public key included in the transaction with an identifier and a public key included in the second certificate to verify the second certificate.

5. The electronic device of claim 1, wherein the processor is configured to verify the second certificate by obtaining a first hash value, which is a hash value of the second certificate, from the transaction, obtaining a second hash value by hashing the second certificate, and comparing the first hash value and the second hash value.

6. The electronic device of claim 1, wherein the processor is further configured to:
verify the third certificate by obtaining a first hash value by decrypting a signature of the third certificate with the public key of the second entity, obtaining a second hash value by hashing identity information of the third certificate, and comparing the first hash value and the second hash value; and
verify the first certificate by obtaining a third hash value by decrypting a signature of the first certificate with the public key of the third entity, obtaining a fourth hash value by hashing identity information of the first certificate, and comparing the third hash value and the fourth hash value.

7. The electronic device of claim 1, wherein the processor is further configured to generate a certificate of the electronic device,
wherein the certificate is signed with a private key of the electronic device, and
wherein a public key of the electronic device is registered at the distributed ledger.

8. The electronic device of claim 1, wherein the interface is configured to receive a registration transaction and a fourth certificate from a fourth entity registered as a member of a third domain different from the first domain and the second domain, and
wherein the processor is configured to verify the registration transaction and the third certificate, and add the registration transaction to the distributed ledger.

9. An electronic device of a first domain, which is a certification authority (CA)-based public key infrastructure (PKI) domain, the electronic device comprising:
an interface configured to:
receive a first certificate from a first entity registered as a member of a second domain;
transmit a verification request and the first certificate to a second entity of the first domain; and
receive a response message, from the second entity, based on the verification request;
a memory configured to store a second certificate of the second entity and a third certificate of a third entity of the first domain, the second certificate having been added to a distributed ledger of the second domain as a transaction comprising a public key of the second entity and a certificate hash value of the second certificate of the second entity, and the third certificate having been issued by the second entity of the first domain; and a processor configured to verify the response message based on the second certificate,
wherein the interface is further configured to:
transmit, to the first entity of the second domain, a certificate of the electronic device, the second certificate, and the third certificate, the certificate of the electronic device having been issued by the third entity of the first domain, the certificate of the electronic device not being registered at the distributed ledger of the second domain, and
allow cryptographic communication with the first entity based on the third certificate being verified and the first certificate being verified, the third certificate being certified based on verification of the second certificate and the public key of the second entity obtained from the second certificate, the first certificate being verified based on verification of the second certificate, verification of the third certificate, a public key of the third entity obtained from the third certificate, the public key of the second entity, and the certificate hash value of the second certificate of the second entity, the third certificate not being registered at the distributed ledger of the second domain,
wherein the first domain has a hierarchical trust certification chain,
wherein the second domain is different from the first domain,
wherein the second entity is an upper CA node in the hierarchical trust certification chain of the first domain, and the second certificate of the second entity is registered in the distributed ledger of the second domain, and
wherein the third entity is an intermediate CA in the hierarchical trust certification chain of the first domain, and is not registered as a member of the second domain.

10. The electronic device of claim 9, wherein the processor is configured to verify the response message by obtaining the public key of the second entity from the second certificate, obtaining a first hash value by decrypting a signature of the response message with the public key, obtaining a second hash value by hashing the response message, and comparing the first hash value and the second hash value.

11. The electronic device of claim 9, wherein the second certificate is signed with a private key of the second entity, and the public key of the second entity is registered at the distributed ledger of the second domain,
wherein the third certificate is signed with the private key of the second entity, and
wherein the certificate of the electronic device is signed with a private key of the third entity.

12. A cryptographic communication system comprising:
a first electronic device belonging to a first domain, which is a blockchain-based public key infrastructure (PKI) domain, registered at a distributed ledger of the first domain;
a second electronic device registered as a member of a second domain, which is a certification authority (CA)-based PKI domain, the second electronic device not being registered as a member of the first domain, the first electronic device not being registered as a member of the second domain; and
a first CA, which is an upper node of the second domain in a hierarchical trust certification chain, and has been added to the distributed ledger as a second transaction based on a registration message comprising a public key of the first CA and a certificate hash value of a second certificate of the first CA, the second transaction indicating that the first CA is registered in the distributed ledger of the first domain,
wherein, based on a request of the second electronic device, the first CA is configured to certify the first electronic device based on a first certificate of the first electronic device and a first transaction corresponding to the first electronic device registered at the distributed ledger,
wherein the first electronic device comprises a processor configured to:
certify the second electronic device based on the second certificate of the first CA, the second transaction corresponding to the first CA registered at the distributed ledger, and a third certificate of the second electronic device that has not been registered at the distributed ledger of the first domain;
receive, from the second electronic device, a fourth certificate of a second CA registered as a member of the second domain, the second CA being an intermediate node of the first CA in the hierarchical trust certification chain, and issuing the third certificate, the fourth certificate not being registered at the distributed ledger of the first domain; and
verify the fourth certificate based on a public key of the first CA obtained from the second certificate and verify the third certificate of the second electronic device based on verification of the second certificate of the first CA, and further based on a public key of the second CA obtained from the fourth certificate.

13. The cryptographic communication system of claim 12, wherein the first CA is configured to look up the first transaction at the distributed ledger based on an identifier of the first electronic device, verify the first certificate based on the first transaction, and transmit a response message to the second electronic device based on verification of the first certificate.

14. The cryptographic communication system of claim 12, wherein the first CA is configured to certify the first electronic device by verifying a signature of the first transaction based on a public key of the first electronic device, certify a signature of the first certificate based on the public key of the first electronic device, determine whether an identifier included in the first transaction is identical to an identifier included in the first certificate, and determine whether a hash value obtained by hashing the first certificate is identical to a hash value of the first certificate included in the first transaction.

15. The cryptographic communication system of claim 12, wherein the first CA is configured to transmit, to the second electronic device, a response message including a verification result of certifying the first electronic device, and
wherein the second electronic device is configured to verify a signature of the response message based on the second certificate.

16. The cryptographic communication system of claim 12, wherein the first electronic device is configured to certify the second electronic device by looking up the second transaction, corresponding to the first CA, at the distributed ledger based on an identifier of the first CA, verifying the second certificate based on the second transaction, verifying the fourth certificate based on a public key of the first CA obtained from the second certificate, and verifying the third certificate based on a public key of the second CA obtained from the fourth certificate.

17. The cryptographic communication system of claim 12, wherein, based on the first CA certifying the first electronic device, the first electronic device is configured to transmit first application data to the second electronic device, and
wherein, based on the first electronic device certifying the second electronic device, the second electronic device is configured to transmit second application data to the first electronic device.

* * * * *